United States Patent [19]

Noll et al.

[11] 4,041,591
[45] Aug. 16, 1977

[54] METHOD OF FABRICATING A MULTIPLE FLOW PATH BODY

[75] Inventors: Dale A. Noll; Giacomo J. Piazza; Robert L. Young, all of Corning, N.Y.

[73] Assignee: Corning Glass Works, Corning, N.Y.

[21] Appl. No.: 660,880

[22] Filed: Feb. 24, 1976

[51] Int. Cl.$^2$ .......................... B23P 15/26; F28F 1/04
[52] U.S. Cl. ............................... 29/157.3 R; 165/165; 165/166; 428/117; 138/115; 29/423
[58] Field of Search .................. 29/157.3 R, 423, 424; 165/165, 166; 65/33; 138/114, 115, DIG. 9; 428/117, 116, 118, 73

[56] References Cited

U.S. PATENT DOCUMENTS

| | | | |
|---|---|---|---|
| 3,111,982 | 11/1963 | Ulbricht | 165/166 |
| 3,176,387 | 4/1965 | Argueso, Jr. et al. | 29/DIG. 26 |
| 3,198,248 | 8/1965 | Stack | 165/166 |
| 3,887,741 | 6/1975 | Dwyer | 428/116 |
| 3,926,251 | 12/1975 | Pei | 165/165 |
| 3,940,301 | 2/1976 | Straw et al. | 165/166 |

*Primary Examiner*—Lowell A. Larson
*Assistant Examiner*—Daniel C. Crane

*Attorney, Agent, or Firm*—Richard N. Wardell; Clarence R. Patty, Jr.

[57] ABSTRACT

An improved method of modifying a honeycombed body having a multiplicity of open-ended cells extending therethrough between opposite face ends of the body to produce therein a multiplicity of flow paths for at least two and possibly three separate fluids. For accommodating two fluids, selected columns of cells within the honeycombed body are provided with openings near at least one face end for first fluid flow through one or two longitudinal, opposed boundary surfaces and through inner cell walls parallel to the cell axes while the open-ends of such columns on a face end perpendicular to the selected cell axes are sealed against fluid flow. Second fluid flow is through the unselected columns of cells parallel to and either in the direction of or counter to the first fluid flow. Specifically, the invention provides an improved method for sealing the selected columns of cells on face ends of the body.

The multiplicity of flow paths, the high area of useful contact between separate fluids and the thin walls between separate fluids make the honeycombed body particularly useful as a fixed recuperator or heat exchanger. A variety of flow path types can be provided in one or both groups of columns of cells, viz. U-, Z-, I-, L- and T-shaped.

10 Claims, 5 Drawing Figures

METHOD OF FABRICATING A MULTIPLE FLOW PATH BODY

BACKGROUND OF THE INVENTION

Rotary heat exchangers, such as those produced and disclosed in U.S. Pat. No. 3,112,184, require costly and bulky accessory equipment such as ring gears, motors, rubbing seals and special housings to function effectively. The ceramic heat exchanger must also be quite strong and sealable to provide for the accessory equipment and the periodic rotation.

These problems of rotary heat exchangers can be solved by providing a fixed recuperator such as suggested by the copending U.S. patent application Ser. No. 660,879 of Everett Kelm which was filed of even date with this application and is assigned to the assignee of this application. Therein it is suggested that a honeycombed body may be modified by providing entrances and exits for a first fluid into selected cells through surfaces perpendicular to the entrance and exit openings in unselected cells for a second fluid so that first and second fluids may be separately applied to and passed through the honeycombed body. The modification requires that selected columns of cells are provided with the alternate entrances and exits and are then sealed at the original entrance and exit ends. The present invention relates to an improved method for providing alternate entrances and exits to selected columns of cells and for sealing the original open-ends of the cells in selected columns.

SUMMARY OF THE INVENTION

The object of the invention is to provide a more facile, economical and efficient fabrication of a fixed heat recuperator from an extruded or laid-up honeycombed body.

In accordance with the objective, the invention is a method of making a multiple flow path body having a plurality of contiguous flow paths extending therethrough for separate fluid flow by modification of a honeycombed body having a matrix of thin walls defining a multiplicity of open-ended cells extending therethrough from one face end thereof to another face end thereof and being bounded on sides generally parallel to cell axes by generally opposed upper and lower boundary surfaces connected by first and second side boundary surfaces, the cells being grouped into a plurality of columns of cells separated from adjacent columns of cells by a fluid barrier wall surfaces extending continuously from the upper to the lower boundary surface and from the one face end to the other face end of the body, wherein the improved method comprises a. Sealing all of the open-ended cells on at least one face end of the honeycomb body with a resist material which enters the cells to a predetermined depth and, preferably, then becomes removably stiff, b. Forming channels of a predetermined depth from the at least one face end (preferably to a depth greater than the depth of the resist material so that the cells in selected columns of cells are reopened near both face ends of the honeycomb body) by removing portions of either or both of the upper and lower boundary surface and portions of the cell walls (and preferably the resist material) in the selected columns of cells, all between fluid barrier wall surfaces in the selected columns, c. Applying a final sealant material to the channels and transforming the channels in the selected columns of cells into open-ended conduits by filling the channels from the face end or ends with the final sealant material to a depth less than the depth of the channels, the resist material in unselected columns of cells meanwhile preventing the filling of cells in unselected columns of cells, and d. Removing the remaining resist material.

The above method is most advantageously practiced by dipping both ends of the fired honeycomb body into a flowable, heat-softened thermoplastic material thereby filling the ends of the cells with material which then becomes rigid upon cooling; thereafter sawing the boundary surfaces and cell walls in selected columns from face ends to form the channels and to remove the resist material from the selected columns; thereafter again dipping the ends of the body into a flowable final sealant, such as high-temperature ceramic cement, so that the channels are partially filled and enclosed from face ends; and thereafter heating the honeycomb body to cure or sinter the final sealant and to heat the remaining plastic or wax resist material until it flows out or is burned out of the unselected cells.

Although not preferred, an alternative fabrication using the resist material is possible. Firstly, the channels may be formed from face ends of the honeycomb body in selected columns of cells to a predetermined depth and thereafter the face ends may be sealed with the resist material which enters the cells and the channels to a depth preferably less than the depth of the channels. Before the resist material stiffens, it is removed from the channels by a blast of gas directed from above or below the honeycombed body toward the openings in the upper or lower boundary surface so that the fluid resist material is blown out of the channels. It is also noted that, if the resist material is of an optimum viscosity, it will flow on its own out of the channels but will remain in the cells in unselected columns after the material is applied to the entire face ends. In either event, the remaining resist material is allowed to stiffen and the remaining steps are completed as in the preferred method.

For use as a heat recuperator or an afterburner in pollution control devices, the honeycomb body is preferably made of a ceramic material but could be made of a metal. Ceramic and metal powders may be formed into honeycombed bodies by a stacking or wrapping process such as described in U.S. Pat. No. 3,112,184 or by extrusion of a plastically formable mass such as shown and described in U.S. Pat. No. 3,790,654, both patents being incorporated herein by reference.

Likewise, the two processes for producing ceramic and metal bodies may be used to make plastic honeycombed bodies which, along with ceramic and metal bodies, may be used in the invention to produce porous multiple flow path bodies useful in filtration or osmosis processes at low temperature.

The inventive method is adaptable to honeycombed bodies having non-parallel and non-planar cell walls forming cells of any cross-sectional shape such as hexagonal, triangular, bowties, T's; but preferably the cell walls are planar and parallel and also form the fluid barrier wall surfaces and square cells. Preferably alternate columns of cells are selected but other selections are possible.

The method preferred also may produce bodies having flow paths for a first fluid which are U-shaped, Z-shaped or I-shaped, depending on whether only one of the upper or lower boundary surfaces is cut on both ends; one of the boundary surfaces is cut on one end while the opposed boundary surface is cut on the other end; or both boundary surfaces are cut on both ends. And whereas it is preferred that one set of the columns of cells are not modified on both ends of the honeycomb body and the other set are modified on both ends to produce U, Z or I-type flow paths for one fluid and straight through flow paths for a second fluid, it is equally possible, though more complicated, to group the cell columns into two groups and then modify one group on one end and modify the other group on the other end or modify both groups on both ends. Modifying a different group of cell columns on each end would result in L-shaped or T-shaped flow paths for both fluids so that the fluids would enter the cell columns from one or both boundary surfaces or from one face end and then exit at the other end of the honeycombed body from the other face end or from one or both boundary surfaces, respectively. Modifying both groups of cell columns at one or both ends would produce U or Z-type flow paths for both fluids of U or Z-type flow paths for one fluid and L-type flow paths for the second fluid. At ends where both groups of cell columns are modified, portions of only one or the upper of lower boundary surface would be removed in the one group and portions of only the other (opposed) boundary surface would be removed for the other group at the end so that separate entrances or exits are maintained for the fluids. Again, these modifications wherein different or both groups of all columns are modified on each end of the honeycomb body, are not preferred and will not be further discussed herein. Further discussion will refer primarily to the preferred process wherein the same group of cell columns is modified at each end.

Three fluids may be accommodated if a barrier wall exists in the honeycomb body intermediate the upper and lower boundary surfaces. Two U-type flow paths (one inverted) and one set of straight through flows paths are then possible, making a body similar to a composite of two U-type flow recuperators held back to back (or lower boundary surface to lower boundary surface).

Fluids are applied to the multiple flow body and are removed therefrom through header or manifold assemblies sealed to the honeycomb body and communicating with all fluid entrance and exit openings.

DETAILED DESCRIPTION OF THE INVENTION

It should be evident that the method of the present invention represents an improvement in the fabrication of fixed recuperators in providing production efficiencies associated with rapid cutting of selected columns, support to thin cell walls by the resist material in unselected columns during cutting, and rapid and selective sealing of selected columns of cells to define the fluid paths through the selected columns.

Figure 1:
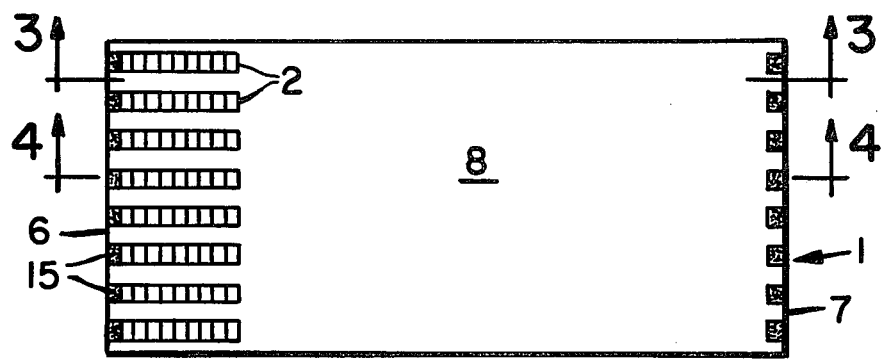
FIG. 1 is a view of the upper boundary surface of the multiple flow path body looking down into the entrance openings and fluid flow conduits in selected alternate columns of cells near one face end of the body.

Looking at FIG. 1, the upper boundary surface 8 of a ceramic, fixed recuperator 1 is shown with inlet openings 2 near one face end 6 providing entry for a first fluid into selected alternate columns of cells in the body. A final sealant material 15 blocks the flow in the selected columns of cells from passing out the face end. The fixed recuperator shown in designed to have the flow paths of a first fluid resemble a Z-type pattern, in that inlet and outlet openings into selected columns of cells are through opposite boundary surfaces (see FIG. 4).

Figure 2:
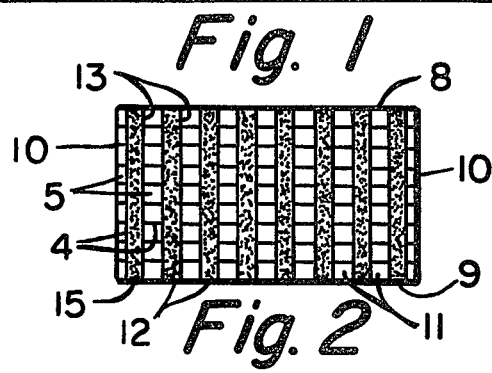
FIG. 2 is a view of the face end of the multiple flow path body showing alternate sealed and open columns of cells.

FIG. 2 shows the end view of the rectangular cross-section recuperator from the one face end 6. A matrix or array of thin walls 4 together define a multiplicity of parallel cells 5 extending through the body. Alternate unselected columns of cells 11 are open from one face end of the body to the other face end thereof while the selected alternate columns of cells 12 are sealed on face ends with the final sealant material 15. Such final sealant material is generally non-porous, able to withstand the temperature, pressure, and chemical attack of the fluids and should have a thermal coefficient of expansion similar to the honeycombed body if high temperatures are contemplated.

Adjacent columns of cells are separated by fluid barrier wall surfaces 13, which are preferably made up of the individual vertical cell walls. In FIG. 2, alternate columns are selected. However, any combination of selected and unselected columns may be used; for example, two adjacent selected columns for each unselected column could be fabricated to provide for greater volume or lower pressure of a first fluid relative to the second fluid.

The cells of the honeycombed body are bounded and protected by an upper boundary surface 8, lower boundary surface 9 and first and second side boundary surfaces 10, all of which are preferably thicker than cell walls 4 for increased strength and protection from mounting structures.

Figure 3:
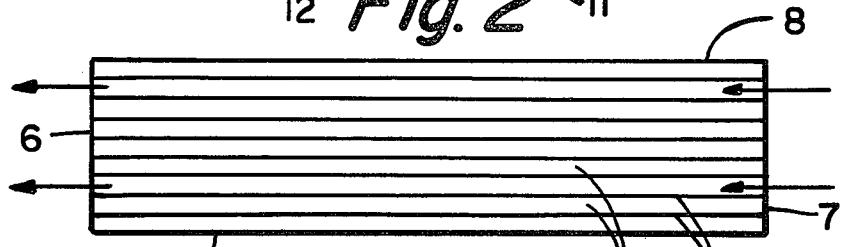
FIG. 3 is a section view of FIG. 1 in an unselected column of cells showing the open cells extending unobstructed from one face end to the other face end for passage of a second fluid.

FIG. 3 shows a section view of FIG. 1 through an unselected column of cells. The thin cell walls 4 form the open-ended cells 5 which pass unobstructed from the one face end 6 to the other face end 7 of the body, providing flow paths for passage of a second fluid therethrough such as suggested by the arrows in the Figure.

Figure 4:
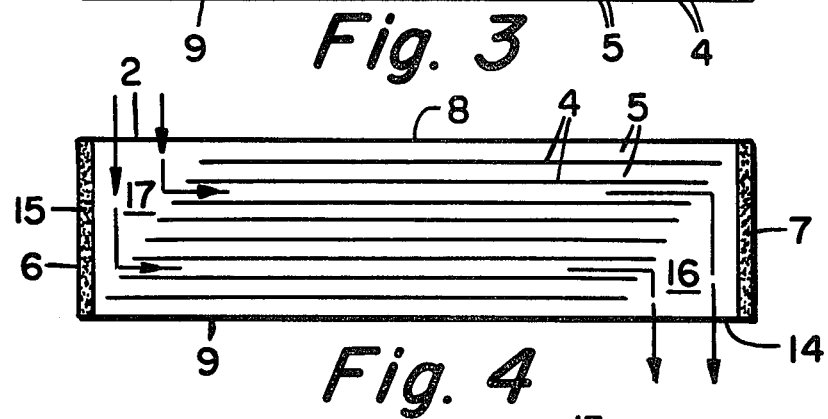
FIG. 4 is a section view of FIG. 1 in a selected column of cells showing Z-type flow paths for a first fluid through an entrance opening in the upper boundary surface, the shortened cells of the column and an exit opening in the lower boundary surface at the opposite end of the body. The Figure also shows the seal on face ends in the selected column.

FIG. 4 shows a section view of FIG. 1 through a selected column of cells. Thin cell walls 4 again are shown forming cells 5. However, the cells, as well as the upper boundary surface 8 near one face end 6 and the lower boundary surface 9 near the other face end 7, have been cut to provide an inlet opening 2, an outlet opening 14, a triangular-space, fluid inlet conduit 17 and a triangular-space, fluid outlet conduit 16 in the selected column of cells between the fluid barrier wall surfaces.

Further, the final sealant material 15 is shown in the selected column of cells to further delineate the first fluid Z-type flow paths as are exemplified by the directions of the arrows in the Figure.

Figure 5:
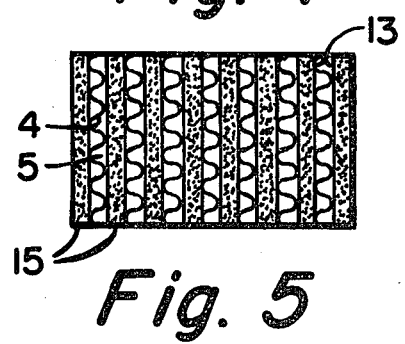
FIG. 5 shows a view of the face end of a multiple flow path body made from a laid-up honeycombed body such as could be produced by U.S. Pat. No. 3,112,184.

FIG. 5 shows a multiple flow path body made from a honeycombed body produced by a laying-up process wherein alternate flat and corrugated green ceramic sheets are stacked and are then covered with boundary surfaces and fired. In FIG. 5 the cell walls 4, the cells 5, the fluid barrier wall surfaces 13 and the final sealant material 15 are shown.

In practicing the method, extruded honeycombed bodies are preferred, as are ceramic compositions predominantly consisting of a low-expansion material, such as cordierite or beta-spodumene disclosed in U.S. Pat. Nos. 3,885,977 and 3,600,204, respectively. The honeycombed body is preferably pre-fired, but it may be in the green state during the method of this invention, in which case the honeycombed body and final ceramic sealant could be co-fired as a final step.

The honeycombed body is preferably dipped into a flowable resist material which can become stiff before the cutting and final sealing steps of the method. The stiff resist material may then be easily removed by heat softening or by chemical means, e.g. leaching. Stiff implies that the resist material is firm enough to remain in the cells and give support to cell walls during cutting and also firm enough to keep the final sealant from filling the unselected columns of cells. Materials such as paraffin, rubbers, silicone rubbers, plastics or other similar thermoplastic materials which become stiff below their softening temperature are appropriate. Slurried inorganic materials which dry to a rigid state and can be selectively removed may also be used but are not preferred. The resist material could also be painted or pressed into the cells but dipping has been effective in filling the cells to a uniform depth of about one-eighth to one-half inch, which is entirely satisfactory for providing support for the thin-walls during the cutting step of the inventive method.

The channels are preferably formed in the selected columns by a gang of band saws or circular saws, although more sophisticated apparatus, such as a laser, could also be used. The saws may be used to make rectangular channels that are generally perpendicular to the cell axes (parallel to the fluid barrier wall surfaces) to provide inlet or outlet openings in both the upper and lower surfaces; or as shown in FIG. 4, the saws may be used to make a triangular channel with a diagonal cut which may be used to primarily cut only one of the upper or lower surface, leaving the other intact and thereby providing for only one inlet or outlet opening near each face end for U-type or Z-type fluid flow. Two diagonal cuts in each selected column may also be used at each end thereby cutting both upper and lower surfaces and forming K-shaped channels at each end.

Actually, using a straight cut on the diagonal may necessitate cutting a portion of the opposed boundary surface so that sufficient portions of nearby cell walls are removed and the nearby cells are not thereafter sealed by the final sealant. In that case, the final sealant would be filled deeply enough to reseal the opposed surface opening as seen in FIG. 1 near the other face end 7.

In any case, in the preferred method, the resist material is filled to a depth generally less than the depth of the cut (depth of the channels) and the body is cooled below the softening temperature in the case of thermoplastic material or dried in the case of an inorganic slip or slurry, to make the resist material stiff. The stiff material then protects the thin walls from breakage and chipping by the saw blades. Most or all of the resist material should be removed from the selected columns during the cutting.

After removing the resist material and portions of the cell walls, the upper boundary surface and/or the lower boundary surface, the final sealant material is applied to the face end of the body to enclose the channels on the face end. Preferably the ceramic honeycombed body is dipped into a ceramic slip, slurry, or cement and the selected columns filled to a depth less than the depth of the channel thereby leaving a conduit through at least one boundary surface and through cell wall portions near the face ends of the body.

The sealant may be applied in any fashion and thereafter is cured or sintered as required to form a strong, non-porous, fluid-resistant seal. If the honeycombed body must also be sintered, a final step of heating may accomplish the sintering of the honeycomb body and the final sealant, as well as the removal of the remaining thermoplastic resist material.

DESCRIPTION OF THE PREFERRED EMBODIMENTS

Example 1

A rectangular 1 × 4 inch honeycombed body, 6 inches long, such as shown in the Figures, was extruded using the method of U.S. Pat. No. 3,790,654 and a raw batch given as body F in U.S. Pat. No. 3,885,977. The raw batch was calculated to yield a fired ceramic body with cordierite as the primary crystal phase. The body was fired and the composition was calculated as about 49.6% $SiO_2$, 35.9% $Al_2O_3$ and 14.5% MgO, by weight, normalized. The honeycombed body had a regular array of 100 mil square cells separated by 10 mil walls and boundary surfaces parallel to the cell axes of about 20 mils thick.

The fired honeycomb was dipped, face end first, into a heat-softened paraffin wax to a depth of about one-fourth inch. The other face end of the honeycomb was dipped and filled similarly.

After cooling the wax to a stiff state, alternate columns of cells on one face end were cut one at a time between vertical fluid barrier walls with a straight saw. The cuts were taken diagonally as shown in FIG. 4 (at an angle of about 50° to the cell axes) thereby cutting the inlet openings in the upper boundary surface at the same time to a depth of almost 1 inch. The same alternate columns of cells were likewise cut on the other face end, this time cutting the outlet openings in the lower boundary surface. A portion of the opposed boundary surface may have to be removed during this type of cut so that cells near the opposed surface will not be blocked by the final sealant. In this case the opposed surface will be resealed by the final sealant.

After cutting, both ends of the honeycombed body were dipped to a depth of one-eigth–one-fourth inch into a ceramic cement slurry consisting of 3 parts by weight of QF180 cement (an alumino-silicate) made by Carborundum Corporation and 1 part finely ground $\beta$-spodumene material with a composition of 78.5% $SiO_2$, 16.6% $Al_2O_3$ and 4.9% $Li_2O$, by weight, and made according to U.S. Pat. No. 3,600,204. A slip consisting of the original cordierite material in a vehicle could likewise have been used.

Following drying of the cement, the body was fired to a temperature of about 1180° C to sinter the cement and burn out the remaining paraffin wax.

The resulting body had separate flow paths for two fluids and was successfully tested as a heat exchanger by applying hot gas to the Z-type flow paths through the inlet openings in the upper surface, and blowing cold air countercurrent to the hot gas through the open-ended cells between face ends of body. The temperature of the inlet gases and the outlet gases were compared and the successful heat transfer was substantiated by the changes in temperature of the gases.

Example 2

A honeycombed body similar to that used in Example 1 was dipped into the paraffin wax on both face ends, filling the cells to a depth of about one-quarter inch. A saw cut was then made in alternate columns of cells perpendicular to cell axes to a depth of about three-fourth inch. The face ends were then dipped in the final sealant used in Example 1 to a depth of less than one-quarter inch and the body was fired to sinter the cement and to remove the remaining paraffin.

The resulting fixed recuperator had, therefore, inlet openings and outlet openings through both upper and lower boundary surfaces thereby providing for I-type flow paths for the first fluid.

Example 3

An alternative fabrication was attempted using a honeycombed body similar to that used in Example 1. A diagonal cut was made in each face end as in Example 1 to a depth of about 1 inch in the boundary surfaces of selected columns of cells and then the face ends were dipped into the fluid wax to a depth of about one-fourth inch. While still fluid, the wax in selected columns was then removed by means of a stream of pressurized air directed from above and below the honeycombed body toward the openings in the upper and lower boundary surfaces, respectively.

After removal of the wax from the selected columns, the remaining wax (in unselected columns) was allowed to stiffen before the face ends were dipped into the cement of Example 1 to a depth of one-eigth–one-fourth inch. Thereafter, the cement was dried and then fired to about 1180° C to sinter the cement and burn out the remaining wax.

We claim:

1. An improved method of fabricating a multiple flow path body having a plurality of contiguous flow paths extending therethrough for separate fluid flow, from a honeycombed body having a matrix of thin walls defining a multiplicity of open-ended cells extending from one face end thereof to another face end thereof and being bounded on sides generally parallel to cell axes by generally opposed upper and lower boundary surfaces connected by first and second side boundary surfaces, the cells being grouped into a plurality of columns of cells, each column being separated from adjacent columns of cells by a fluid barrier wall surface extending continuously from the upper boundary surface to the lower boundary surface and from the one face end of the honeycombed body to the other face end thereof, wherein the improvement comprises
   a. sealing the open-ended cells on at least one face end of the honeycombed body with a resist material which enters the cells to a predetermined depth, and thereafter becomes removably stiff,
   b. forming channels of a predetermined depth in selected columns of cells from the at least one face end of the honeycombed body by removing portions of the cell walls and portions of at least one of the upper boundary surface and the lower boundary surface, all between adjacent fluid barrier wall surfaces in the selected columns of cells,
   c. applying a final sealant material to the channels and transforming the channels in the selected columns of cells into conduits having at least one open-end by filling the channels from the at least one face end with the final sealant material to a depth less than the depth of the channels, and
   d. removing the remaining resist material.

2. The method of claim 1 wherein the selected columns of cells alternate with unselected columns of cells.

3. The method of claim 1 wherein the resist material is thermoplastic and the final sealant is a ceramic cement.

4. The method of claim 1 wherein the channels are formed by removing portions of the cell walls and portions of only one boundary surface near each face end so that U-type flow paths are formed.

5. The method of claim 1 wherein the channels near the one face end are formed by removing portions of the cell walls and portions of one boundary surface and the channels near the other face end are formed by removing portions of cell walls and portions of the opposed boundary surface so that Z-type flow paths are formed.

6. The method of claim 1 wherein the channels near each face end are formed by removing portions of the cell walls and portions of both the upper and lower boundary surfaces so that I-type flow paths are formed.

7. An improved method of fabricating a multiple flow path body having a plurality of contiguous flow paths extending therethrough for separate fluid flow, from an extruded ceramic honeycombed body having a matrix of thin walls defining a multiplicity of open-ended cells extending from one face end thereof to another face end thereof and being bounded on sides generally parallel to cell axes by generally opposed upper and lower boundary surfaces connected by first and second side boundary surfaces, the cells being grouped into a plurality of columns of cells, each column being separated from adjacent columns of cells by a fluid barrier wall surface consisting of the thin cell walls which extend continuously from the upper boundary surface to the lower boundary surface and from the one face end of the honeycombed body to the other face end thereof, wherein the improvement comprises:
   a. filling the open-ended cells on both face ends of the honeycombed body to a predetermined depth from each face end with a heatsoftened thermoplastic resist material,
   b. cooling the resist material below its softening termperature,
   c. forming channels of a predetermined depth in selected columns of cells from both face ends of the honeycombed body and removing substantially all of the resist material from selected columns of cells by cutting portions of cell walls and portions of at least one of the upper boundary surface and the lower boundary surface, all between adjacent fluid barrier wall surfaces in the selected columns of cells,
   d. applying a ceramic cement to the channels and transforming the channels in the selected columns of cells into conduits having at least one open-end by filling the channels from face ends with the ceramic cement to a depth less than the depth of the channels and e. heating the honeycombed body to temperatures at which the resist material is removed and the ceramic cement is sintered.

8. An improved method of fabricating a multiple flow path body having a plurality of contiguous flow paths extending therethrough for separate fluid flow, from a honeycombed body having a matrix of thin walls defining a multiplicity of open-ended cells extending from one face end thereof to anoher face end thereof and being bounded on sides generally parallel to cell axes by generally opposed upper and lower boundary surfaces connected by first and second side boundary surfaces, the cells being grouped into a plurality of columns of cells, each column being seperated from adjacent columns of cells by a fluid barrier wall surface extending continuously from the upper boundary surface to the lower boundary surface and from the one face end of the honeycombed body to the other face end thereof, wherein the improvement comprises a. forming channels of a predetermined depth in selected columns of cells from both face ends of the honeycombed body by removing portions of the cell walls and portions of at least one of the upper boundary surface and the lower boundary surface, all between adjacent fluid barrier wall surfaces in the selected columns of cells, thereafter b. sealing the open-ended cells in unselected columns of cells and enclosing the channels on both face ends of the honeycombed body with a resist material which enters the cells and channels to a predetermined depth, c. selectively removing the resist material from the channels in the selected column of cells, d. stiffening the remaining resist material in unselected columns of cells, d. stiffening the remaining resist material in unselected columns of cells, e. applying a final sealant material to the channels and transforming the channels in the selected columns of cells into conduits having at least one open-end by filling the channels from face ends with the final sealant material to a depth less than the depth of the channels, and f. removing the remaining resist material.

9. An improved method of fabricating a multiple flow path body having a plurality of contiguous flow paths extending therethrough of separate fluid flow, from a honeycombed body having a matrix of thin walls defining a multiplicity of open-ended cells extending from one face end thereof to another face end thereof an being bounded on sides generally parallel to cell axes by generally opposed upper and lower boundary surfaces connected by first and second side boundary surfaces, the cells being grouped into a plurality of columns of cells, each cell column being separated from adjacent columns of cells by a fluid barrier wall surface extending continuously from the upper boundary surface to the lower boundary surface and from the one face end of the honeycombed body to the other face end thereof, and each column being designated a member of a first group or a second group of cell columns, wherein the improvement comprises a. sealing the open-ended cells on both face ends of the honecombed body with a resist material which enters the cells to a predetermined depth, and thereafter becomes removably stiff, b. forming channels of a predetermined depth in the cell columns of at least one of the first and second groups of cell columns from the one face end of the honeycombed body by removing portions of the cell walls and portions of at least one of the upper boundary surface and the lower boundary surface, all between adjacent fluid barrier wall surfaces in the columns of cells near the one face end, c. forming channels of a predetermined depth in the cell columns of at least one of the first and second groups of cell columns from the other face end of the honeycombed body by removing portions of the cell walls and portions of at least one of the upper boundary surface and the lower boundary surface, all between adjacent fluid barrier wall surfaces in the columns of cells near the other face end, d. applying a final sealant material to the channels and transforming the channels in the columns of cells into conduits having at least one open-end by filling the channels from both face ends with the final sealant material to a depth less than the depth of the channels, and e. removing the remaining resist material.

10. The method of claim 9 wherein, in each of steps (b) and (c), the channels are formed in both groups of cell columns, portions of only one of the upper and lower boundary surfaces are removed in the first group of cell columns and portions of only the generally opposed boundary surface are removed in the second group of cell columns.

* * * * *

UNITED STATES PATENT AND TRADEMARK OFFICE
CERTIFICATE OF CORRECTION

PATENT NO. : 4,041,591
DATED : August 16, 1977
INVENTOR(S) : Dale A. Noll, Giacomo J. Piazza and Robert L. Young It is certified that error appears in the above-identified patent and that said Letters Patent are hereby corrected as shown below:

Column 4, line 21, change "in" to -- is -- .

Column 9, line 12, change "anoher" to -- another -- .

Column 9, lines 36-38 delete "d. stiffening the remaining resist material in unselected columns of cells,"

Column 9, line 50, change "of" to -- for -- .

Column 10, line 3, change "an" to -- and -- .

Signed and Sealed this

Twenty-second Day of November 1977

[SEAL]

Attest:

RUTH C. MASON
Attesting Officer

LUTRELLE F. PARKER
Acting Commissioner of Patents and Trademarks